Figure 1:
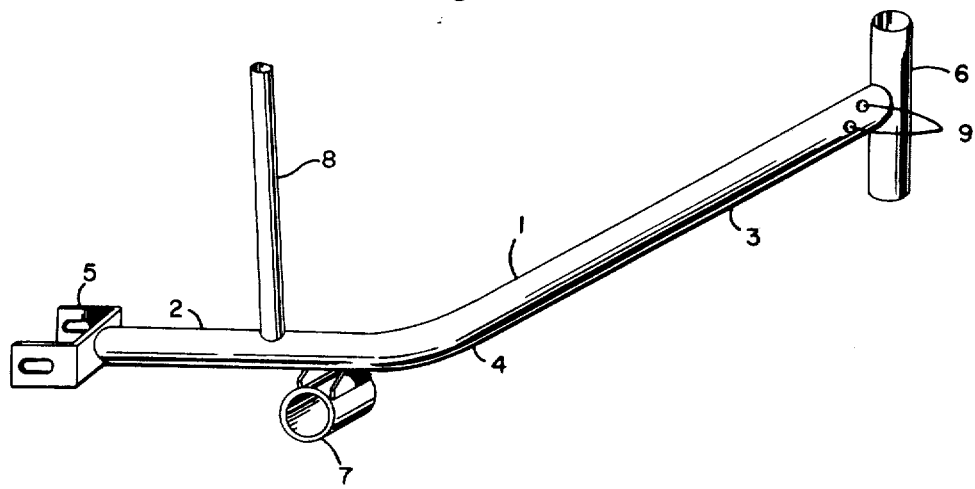

United States Patent

Hendricks et al.

[15] 3,701,545
[45] Oct. 31, 1972

[54] FRAME FOR UTILIZATION WITH A THREE-WHEEL, PEDAL DRIVEN VEHICLE

[72] Inventors: Robert G. Hendricks; Billie J. Eberhart, both of 9242 North 36th Drive, Phoenix, Ariz. 85021

[22] Filed: Dec. 17, 1969

[21] Appl. No.: 885,841

[52] U.S. Cl. ................................280/282, 280/7.15
[51] Int. Cl. ..............................................B62k 5/06
[58] Field of Search......280/261, 7.15, 7.1, 282, 281, 280/236; D90/8

[56] References Cited

UNITED STATES PATENTS

| | | | |
|---|---|---|---|
| 1,563,094 | 11/1925 | Ledig | 280/261 |
| 3,229,988 | 1/1966 | Mansperger | 280/7.15 |

FOREIGN PATENTS OR APPLICATIONS

| | | | |
|---|---|---|---|
| 551,495 | 4/1957 | Belgium | 280/261 |
| 1,067,001 | 1/1954 | France | 280/281 |
| 534,657 | 1/1955 | Belgium | 280/281 |
| 13,285 | 11/1896 | Switzerland | 280/202 |

*Primary Examiner*—Kenneth H. Betts
*Attorney*—Drummond, Cahill & Phillips

[57] ABSTRACT

In order to convert a bicycle to a three-wheeled vehicle, a frame member is provided which consists of a single primary tube extending between the front and rear wheel support means with seat support means and front sprocket journal support means fixed thereto. The primary tube of the frame has first and second straight sections and an intermediate curved section. The first straight section extends forwardly from the rear wheel assembly to the rearward terminus of the curved section, and the second straight section extends downwardly and rearwardly from the front wheel assembly to the forward terminus of the curved section.

1 Claim, 2 Drawing Figures

PATENTED OCT 31 1972

3,701,545

INVENTOR.
ROBERT G. HENDRICKS
BILLIE J. EBERHART
BY
Drummond, Cahill & Phillips
ATTORNEYS

FRAME FOR UTILIZATION WITH A THREE-WHEEL, PEDAL DRIVEN VEHICLE

This invention relates to an improvement in bicycle attachments and, more particularly, to an attachment for use in converting a conventional bicycle into a three-wheel vehicle.

Apparatus for converting a two-wheel bicycle into a three-wheel vehicle are known in the prior art. However, the prior art apparatus has been largely unsuccessful because the resulting three-wheel vehicle has a crude and ungainly appearance brought about by the use of the existing frame. Moreover, apart from appearance, the use of the bicycle frame presents relatively high structure which must be surmounted by the rider to mount the vehicle. This is a severe drawback to the use of such vehicles by those handicapped by age or otherwise, precisely the individuals who would be expected to use the three-wheel vehicle.

It is therefore a broad object of this invention to provide an improved bicycle attachment for use in converting a bicycle into a three-wheel vehicle.

It is a more specific object of this invention to provide an attachment which renders the conversion simple and relatively inexpensive.

It is another specific object of this invention to provide an attachment for converting a bicycle into a three-wheel vehicle which is especially easy to mount and dismount.

Figure 2:
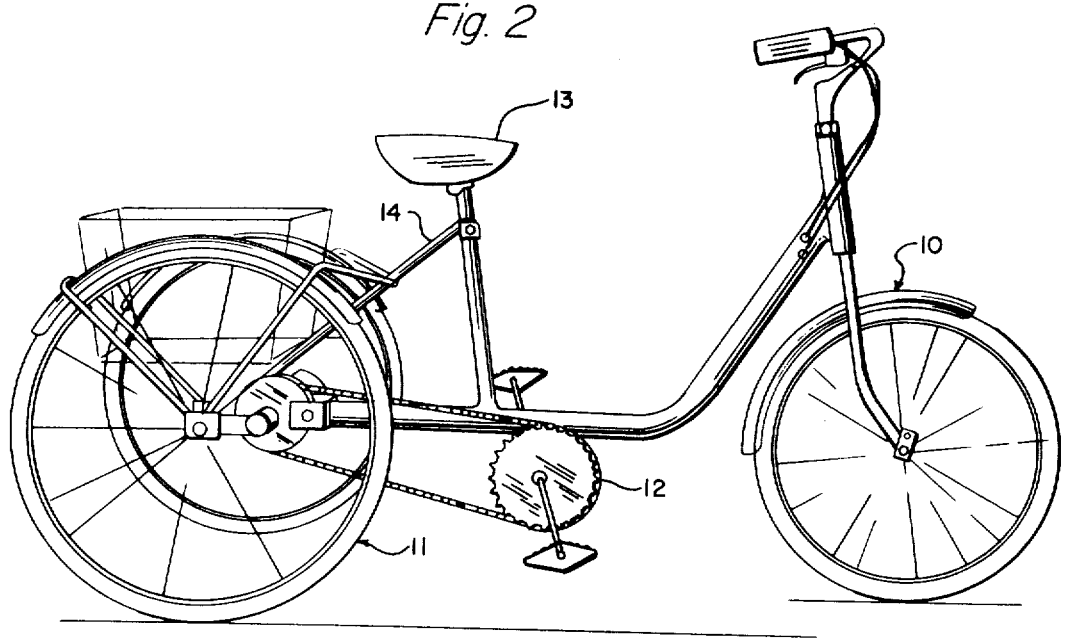

These and other objects of the invention will be best understood by those skilled in the art by reference to the following description taken in conjunction with the accompanying drawing of which:

FIG. 1 is a perspective view of the bicycle attachment of the present invention; and FIG. 2 is a perspective view showing the bicycle attachment in place in a converted three-wheel vehicle.

Referring now to FIG. 1, it will be observed that the attachment 1 generally consists of a single primary tube having a first straight section 2 and a second straight section 3 linked by a curved section 4. The rearward end of the first straight section 2 terminates in a fork 5 adapted for coupling with a rear wheel assembly as will be described below. The forward end of the second straight section 3 terminates in a tubular housing 6 adapted to receive and support a bicycle front wheel assembly. A second tubular housing 7 is fixed beneath the attachment 1 adjacent the rearward terminus of the curved section 4. The tubular housing 7 is oriented transverse to the first straight section 2 to receive and support the bearing structure for a pedal driven front sprocket. A tubular member 8 extends upwardly and rearwardly from the attachment 1 from a position just to the rear of the position of the transverse tubular housing 7 and serves as a seat post. A pair of holes 9 are provided adjacent the first tubular housing 6 for inserting brake and shift linkage cables into the interior of the attachment 1 such that they can be brought to the rear wheel assembly in an orderly and safe manner.

A three-wheel vehicle converted from a conventional bicycle through the use of the present invention is depicted in FIG. 2. It will be observed that the front wheel assembly 10 couples to the attachment 1 by substituting the tubular housing 6 for the corresponding housing of the discarded bicycle frame. Similarly, the rear wheel assembly 11 is fixed to the forked section 5 at the rear of the attachment 1 with conventional nuts and bolts or other means of rigid attachment. The pedal driven front sprocket 12 is secured in the tubular housing 7 in a manner identical to that used for securing it to the corresponding housing of the discarded bicycle frame. A seat 13 slips into the tubular seat post member 8, and braces 14 extend from the top of the seat post to positions in the rear wheel assembly somewhat outboard from the center to provide increased rigidity.

Although the tubular housing 7 for receiving the pedal driven sprocket bearing assembly is shown in FIGS. 1 and 2 as being beneath the first straight section 2, it will be understood that the housing 7 could be placed above the first straight section 2 or the curved section 4 by increasing the angle of the curved section 4 such that the first straight section 2 extends somewhat downwardly, as well as forwardly, from the rear wheel assembly 11. Thus, while the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

We claim:

1. A cycle frame attachment for incorporation into a three-wheeled vehicle having front single and rear dual wheel assemblies and hand operated cable-linked controls comprising: a frame member extending between the front and rear wheel assemblies, said frame member comprising a single primary tube having first and second straight sections and an intermediate curved section, said first straight section extending from a forked structure comprising a means for attachment to the rear wheel assembly forwardly to the rearward terminus of said curved section, said second straight section extending from a position of attachment to said front wheel assembly downwardly and rearwardly to the forward terminus of said curved section, at least one cable hole in said frame member proximate said forward end of said second straight section for receiving hand-operated cables which pass through said frame member and exit at the rearward terminus of said first straight section for operative communication with the rear dual wheel assembly, tubular front sprocket journal support means fixed beneath and oriented transverse with respect to said frame member adjacent the rearward terminus of said curved section, and a seat support tube fixed to said frame member and extending upwardly and rearwardly from a position on said frame member proximate the position of said sprocket journal means.

* * * * *